(12) United States Patent
Shin

(10) Patent No.: US 11,425,135 B2
(45) Date of Patent: Aug. 23, 2022

(54) METHOD FOR PLATFORM USER MANAGEMENT USING BADGE SYSTEM

(71) Applicant: Sang Hyun Shin, Seoul (KR)

(72) Inventor: Sang Hyun Shin, Seoul (KR)

( * ) Notice: Subject to any disclaimer, the term of this patent is extended or adjusted under 35 U.S.C. 154(b) by 147 days.

(21) Appl. No.: 16/812,231

(22) Filed: Mar. 6, 2020

(65) Prior Publication Data

US 2020/0287906 A1 Sep. 10, 2020

(30) Foreign Application Priority Data

Mar. 8, 2019 (KR) .................. 10-2019-0027123
Jul. 5, 2019 (KR) .................. 10-2019-0081229

(51) Int. Cl.
| | |
|---|---|
| *G06F 21/10* | (2013.01) |
| *H04L 9/40* | (2022.01) |
| *H04L 67/306* | (2022.01) |
| *G06Q 10/10* | (2012.01) |
| *G06Q 30/02* | (2012.01) |
| *G06F 21/33* | (2013.01) |

(52) U.S. Cl.
CPC ............ *H04L 63/102* (2013.01); *G06F 21/10* (2013.01); *G06F 21/33* (2013.01); *G06Q 10/10* (2013.01); *G06Q 30/0215* (2013.01); *H04L 63/0853* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2012/0331568 A1* | 12/2012 | Weinstein | H04L 12/185 726/29 |
| 2014/0006930 A1* | 1/2014 | Hollis | G06F 16/951 715/234 |
| 2017/0272441 A1* | 9/2017 | McClintock | H04L 9/3247 |
| 2019/0050557 A1* | 2/2019 | Martin | H04L 63/08 |
| 2020/0143405 A1* | 5/2020 | Tucker | G06Q 20/384 |

FOREIGN PATENT DOCUMENTS

| | | |
|---|---|---|
| JP | 2001325471 A | 11/2001 |
| KR | 20060090806 A | 8/2006 |
| KR | 20100006096 A | 1/2010 |
| KR | 20130077433 A | 7/2013 |
| KR | 101327530 B1 | 11/2013 |
| KR | 20170027177 A | 3/2017 |
| KR | 20180112027 A | 10/2018 |

OTHER PUBLICATIONS

International Search Report issued in PCT/KR2020/003239; dated Jun. 9, 2020.

* cited by examiner

*Primary Examiner* — Nicholas R Taylor
*Assistant Examiner* — Ho T Shiu
(74) *Attorney, Agent, or Firm* — Studebaker & Brackett PC

(57) ABSTRACT

Provided is a platform user management method using a badge system performed by a computing device. The method comprises granting a badge generation permission to a first user account, generating a first badge according to a request for using the badge generation permission of the first user account, granting the first badge to the second user account and activating a first permission to a second user account when the first badge is equipped to the second user account.

20 Claims, 23 Drawing Sheets

FIG. 11

| | DETAILED CONTRACT AND ADDITIONAL INFORMATION | |
|---|---|---|
| 1001 — SPECIAL CONTRACT 1 | #61 CONTENT NOT PASSED THROUGH DISTRIBUTOR/AGENCY | AGENCY 5 : ARTIST 5 ▽ — 1002 |
| 1003 — SPECIAL CONTRACT 2 | #99 BLOCKCHAIN POINT DIRECTLY GIVEN BY FAN | AGENCY 2 : ARTIST 8 ▽ — 1004 |
| 1005 — MARKET CONFIGURATION | PARTIALLY ALLOWED ▽ | |

1006 — AUTHORIZED* PRODUCT
- ☐ (Music / Album)
- ☐ (Fashion)
- ☐ (Handmade)
- ☑ (Commodify)

COMPANY | ENTER COMPANY'S ID CARD

METHOD FOR PLATFORM USER MANAGEMENT USING BADGE SYSTEM

This application claims the benefit of Korean Patent Application No. 10-2019-0027123 filed on Mar. 8, 2019 and Korean Patent Application No. 10-2019-0081229 filed on Jul. 5, 2019, in the Korean Intellectual Property Office, the disclosure of which is incorporated herein by reference in its entirety.

BACKGROUND

1. Field

The present disclosure relates to a method and apparatus for managing a user using a platform service.

2. Description of the Related Art

Through online platform services, various contents of users are distributed. However, the permission control of each user is possible only by the service provider, and the permission control technology of the affiliated users by the user who needs permission control on the platform for each artist user such as an artist management company is not provided. Further, no verification technology is provided to determine whether the user on the online platform service is a well-known celebrity.

SUMMARY

An embodiment of the present disclosure is to provide a platform user management method and apparatus capable of controlling permission between users and preventing celebrity impersonation via a badge including data on the permission on the platform service.

Embodiments of the present disclosure are not limited to the above-mentioned embodiments, and other embodiments not mentioned will be clearly understood by those skilled in the art from the following description.

According to an embodiment of the present disclosure, a platform user management method using a badge system is performed by a computing device, the method comprises granting a badge generation permission to a first user account, generating a first badge according to a request for using the badge generation permission of the first user account, granting the first badge to the second user account, and activating a first permission to a second user account when the first badge is equipped to the second user account.

According to an embodiment of the present disclosure, a platform user management apparatus using a badge system comprises a memory for storing one or more instructions, and a processor, by executing the stored one or more instructions, for granting a badge generation permission to a first user account, generating a first badge according to a request for using the badge generation permission of the first user account, granting the first badge to the second user account, and activating a first permission of a second user account when the first badge is equipped to the second user account.

According to an embodiment of the present disclosure, a program is stored in a computer readable recording medium, the program executes in conjunction with a computing device steps which comprise granting a badge generation permission to a first user account, generating a first badge including a first contractual relationship between the first user and a second user according to a request for using the badge generation permission of the first user account, granting the first badge to the second user account, and activating a first permission of a second user account when the first badge is equipped to the second user account.

BRIEF DESCRIPTION OF THE DRAWINGS

These and/or other aspects will become apparent and more readily appreciated from the following description of the embodiments, taken in conjunction with the accompanying drawings in which:

FIGS. 7 to 12 are exemplary diagrams of an administrator page displayed on a first user terminal for describing management tasks such as badge generation and management through the administrator page.

DETAILED DESCRIPTION

Figure 1:
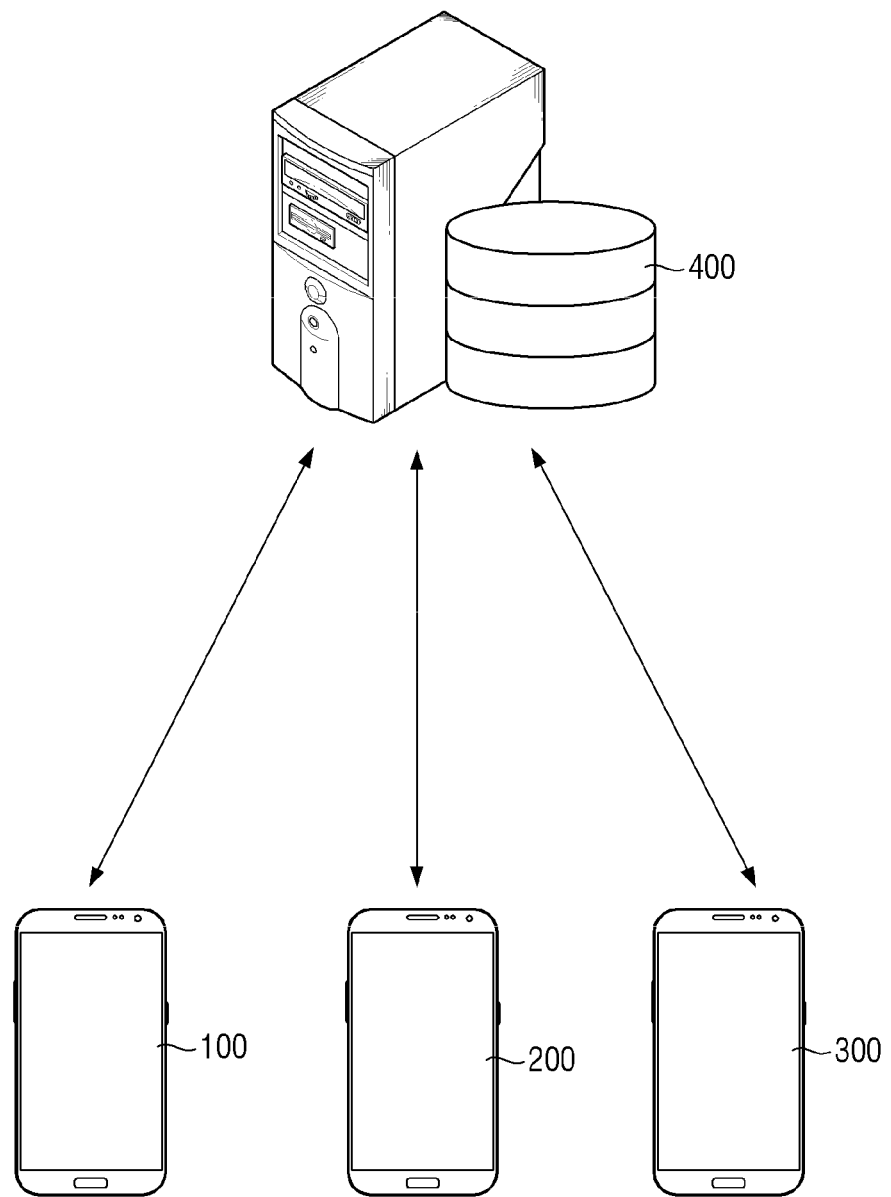
FIG. 1 is an exemplary configuration diagram illustrating a platform user management system using a badge system according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present invention will be described in detail with reference to the accompanying drawings.

FIG. 1 is an exemplary configuration diagram illustrating a system for providing a platform user management method using a badge system according to some embodiments of the present disclosure.

As shown in FIG. 1, a system for providing a platform user management method using a badge system according to some embodiments may include a server 400, a first user terminal 100, a second user terminal 200 and a third user terminal 300. However, this is only a preferred embodiment for achieving the object of the present disclosure, and some components may be added or deleted as necessary. Hereinafter, each component is briefly described.

The server 400 is a computing device or system that provides a platform user management service using a badge system, and may be configured with one or more server devices (i.e., computing devices). Here, the computing device may be a desktop, a laptop, and the like, but is not limited thereto and may include all kinds of devices equipped with a computing function and a communication function. Some examples of such computing devices refer to FIG. 23.

The system configuration shown in FIG. 1 is based on a centralized architecture according to the server-client model. It should be noted that the system according to the present embodiment also may be implemented based on blockchain technology. In this case, each event data generated in the implementation of the platform service may be included in the blockchain and distributed and stored in each blockchain node. The blockchain node may be each user terminal 100, 200, 300, or may be a dedicated blockchain node device separated from each user terminal 100, 200, 300. Of course, even if the system according to the present embodiment is implemented based on the blockchain technology, the service server performing the role of DAPP update, DAPP server, etc. may be included in the system according to the present embodiment.

The first user terminal 100 is a computing device used by a user, who manages a user of another user terminal. The first user terminal 100 may be a smart phone, a smart watch, etc., but is not limited thereto and may include any device provided with a computing means and a communication means.

The second user terminal 200 is a computing device used by a user, who is managed by the first user terminal 100. The user of the second user terminal 200 may be a smart phone, a smart watch, etc., like the first user terminal 100, but is not limited thereto and may include any device provided with a computing means and a communication means.

The third user terminal 300 is a computing device used by a user, who consumes content uploaded by a user of the second user terminal 200. The third user terminal 300 may also be a smart phone, a smart watch, etc., but is not limited thereto and may include any device provided with a computing means and a communication means.

In some embodiments, an application (APP) is downloaded to the first user terminal 100, the second user terminal 200, and the third user terminal 300, and the service providing a platform user management method using a badge system through the APP may be used. An application (APP) refers to an application that can be executed on a smart device such as a smartphone or smart TV.

The first user, the second user and the third user each may install an APP in the first user terminal 100, the second user terminal 200 and the third user terminal 300, and proceed a membership subscription through the APP. At this time, a user having a user account equipped with a badge having an upload permission may register contents produced by the user through the APP installed in the user terminal 100, 200, 300.

When the server 400 receives a request for the first badge generation permission from the user account of the first user terminal 100, the server 400 may determine whether the first user account is a registered administrator account. If the first user account is a registered administrator account, the first badge generation permission may be granted to the first user account.

The user of the first user account may grant a first badge to the second user account when the user of the second user account satisfies the first badge acquisition condition.

In this case, the first badge may contain a first permission. The first permission may be, for example, a permission to upload content, a permission to upload content of a specified type or a permission to upload content smaller than or equal to a specified size. However, it is not limited thereto.

When the first badge is equipped to the second user account, the first permission of the second user account may be activated. When the first permission of the second user account is activated, the platform activity history score associated with the first permission may be calculated, and if the calculated activity history score is less than or equal to a threshold, the notification may be sent to the first user account. Here, equipping the badge to the user account means granting the permission included in the badge to the user account.

In some embodiments, the server 400 may receive a request from the user account of the first user terminal 100 and generate a second badge, and grant the second badge to the user account of the third user terminal 300 if an activity history score of the user account of the third user terminal 300 for the platform exceeds the threshold.

In some embodiments, server 400 may deactivate the first permission of the second user account and extinguish the first badge of the second user account in response to the first badge extinction request of the first user account for the second user account.

The components shown in FIG. 1 can communicate via a network. The network may be implemented with any type of wired/wireless network such as a local area network (LAN), a wide area network (WAN), a mobile radio communication network, a wireless broadband Internet (Wibro), or the like.

A system for providing a platform user management method using a badge system according to some embodiments of the present disclosure has been described with reference to FIG. 1. Hereinafter, a platform user management method using a badge system according to some embodiments of the present disclosure will be described in detail with reference to FIGS. 2 to 22.

Each step of the platform user management method using the badge system may be performed by a computing device. In other words, each step of the platform user management method using the badge system may be implemented with one or more instructions executed by a processor of the computing device.

An instruction is a series of computer readable instructions, grouped by function, that is a component of a computer program and executed by a processor.

All steps included in the platform user management method using the badge system may be executed by one physical computing device, but the first steps of the method may be performed on the first computing device and the second steps of the method may be performed by the second computing device.

The platform user management method using the badge system may be performed in various systems and/or environments. However, the description of the environment illustrated in FIG. 1 will be continued for convenience of understanding. Further, unless otherwise mentioned, it is assumed that each step of the platform user management method using the badge system is performed by the server 400. Thus, when the subject f each operation is omitted, it can be understood that each operation is performed by the illustrated apparatus 400. In addition, the methods described below may be changed in order of operations within a range, in which the performance order may be logically changed as necessary.

Figure 2:
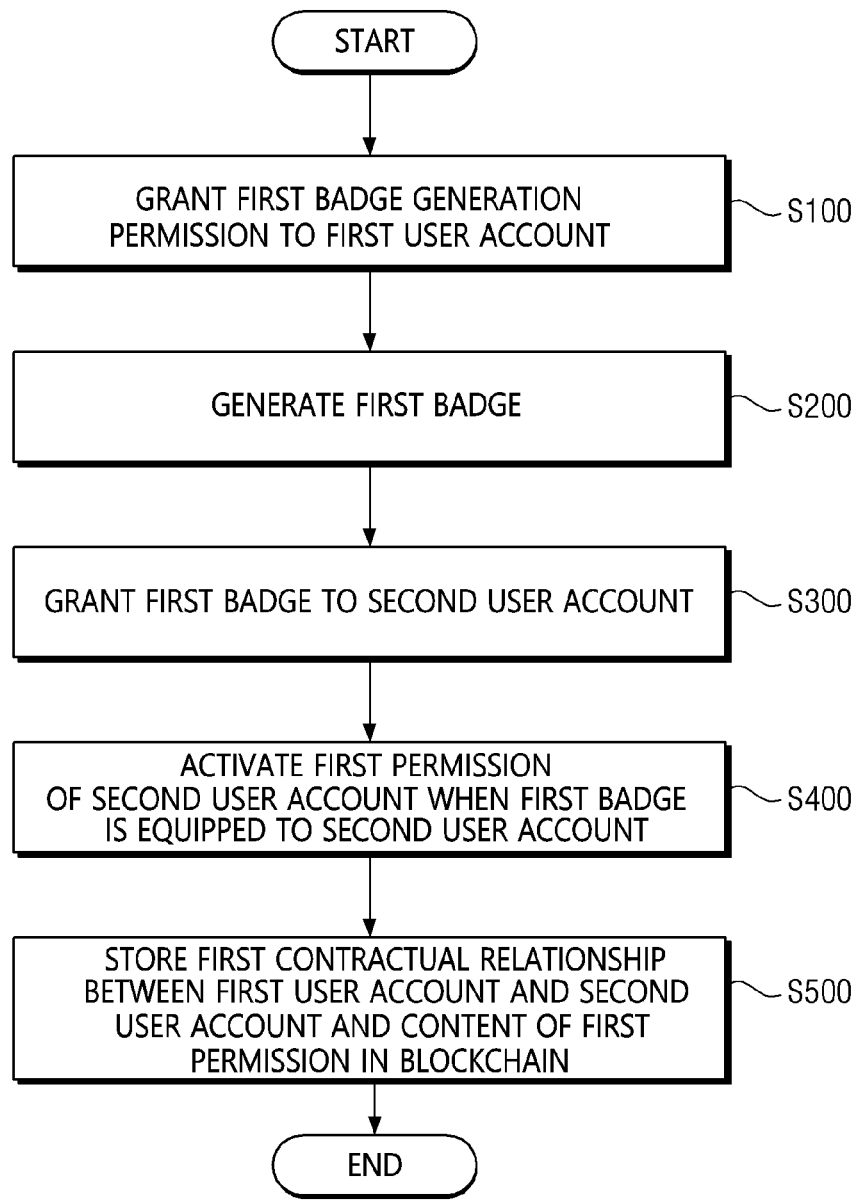
FIG. 2 is an exemplary flowchart illustrating a platform user management method using a badge system according to some embodiments of the present disclosure.

FIG. 2 is an exemplary flowchart illustrating a platform user management method using a badge system according to some embodiments of the present disclosure. However, this is only a preferred embodiment for achieving the object of the present disclosure and some steps may be added or deleted as necessary.

As shown in FIG. 2, the platform user management method using the badge system may include the badge generation permission granting process (S100) of granting a first badge generation permission to a first user account, the badge generation process (S200) of generating a badge according to the badge generation permission, the badge granting process (S300) of granting the generated badge to the user account, the permission activation process (S400) of equipping the granted badge to activate the permission and the information storing process (S500) of storing contractual relationship between the user accounts and the permission content. Hereinafter, each process will be described in more detail with reference to FIGS. 3 to 6.

Figure 3:
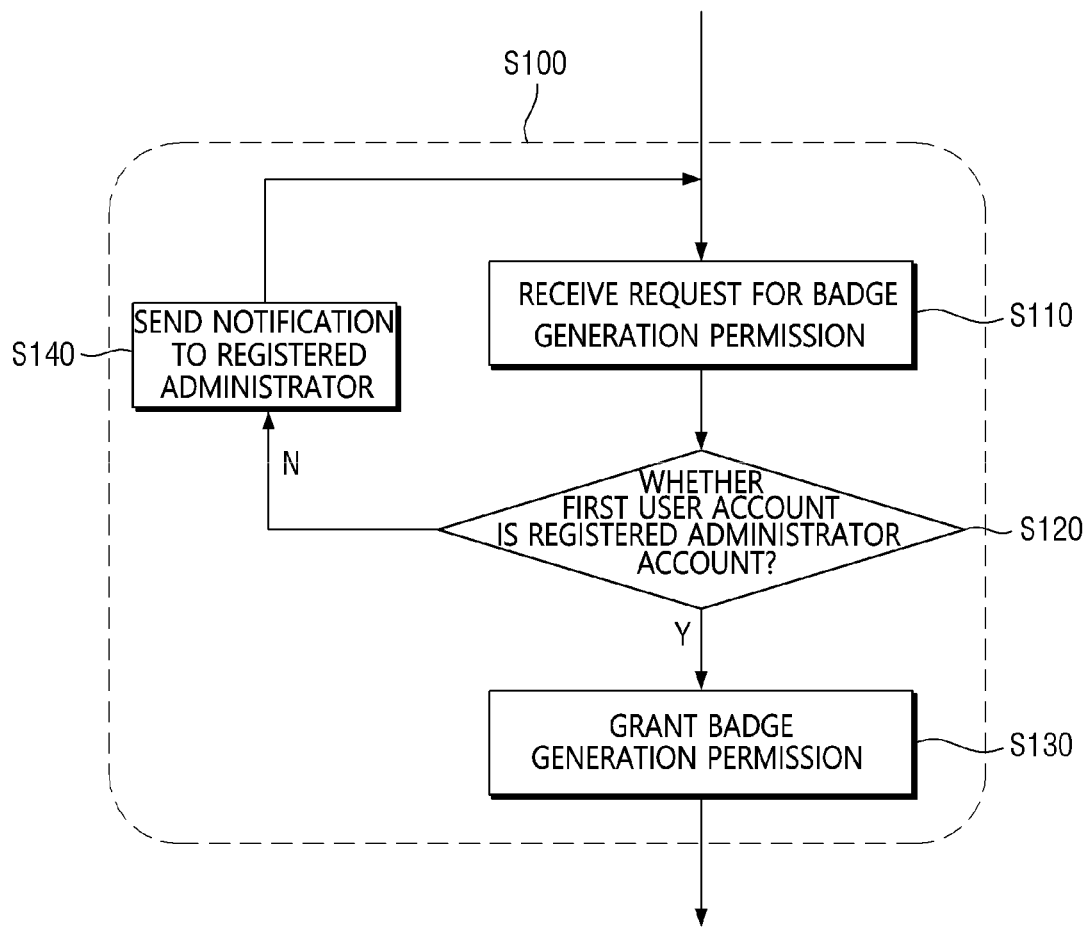
FIG. 3 is a flowchart for describing a method of granting a first badge generation permission to a first user account of step S100 of FIG. 2.

FIG. 3 is a flowchart illustrating a procedure, in which a badge generation permission granting process S100 is performed.

Referring to FIG. 3, first, a request for a first badge generation permission may be received from a first account (S110).

Thereafter, it may be determined whether the first account is a registered administrator account using the first badge generation permission request received in step S110 (S120). Here, the registered administrator account refers to an account that has previously registered a certificate or the like for confirming that the user of the first account is an administrator.

Next, if it is determined that the first account is a registered administrator account, the first badge generation permission may be granted (S130). On the contrary, if it is determined that the first account is not a registered administrator account, the notification may be generated to the registered administrator account (S140). Here, the notification means sending a guide message indicating that the account of the user, who sent the badge generation permission request in step S110, is not a registered administrator account. However, it is not limited thereto.

That is, the badge generation permission may be granted only to an account that has become a credential through the badge generation permission granting process (S100), thereby improving the reliability of the badge.

In some embodiments of the present disclosure, it can be understood that a user, who is granted the generation permission of a badge, may have the ability of granting a permission to the affiliated user by including the permissions for the affiliated user in the badge and the ability to inform other users by means of the generated badge that the page operated by the affiliated users is not a celebrity impersonation page.

Referring back to FIG. 2, after the badge generation permission is granted through the badge generation permission granting process (S100), the first badge is generated by the badge generation process (S200). Hereinafter, a description will be given with reference to FIG. 4.

Figure 4:
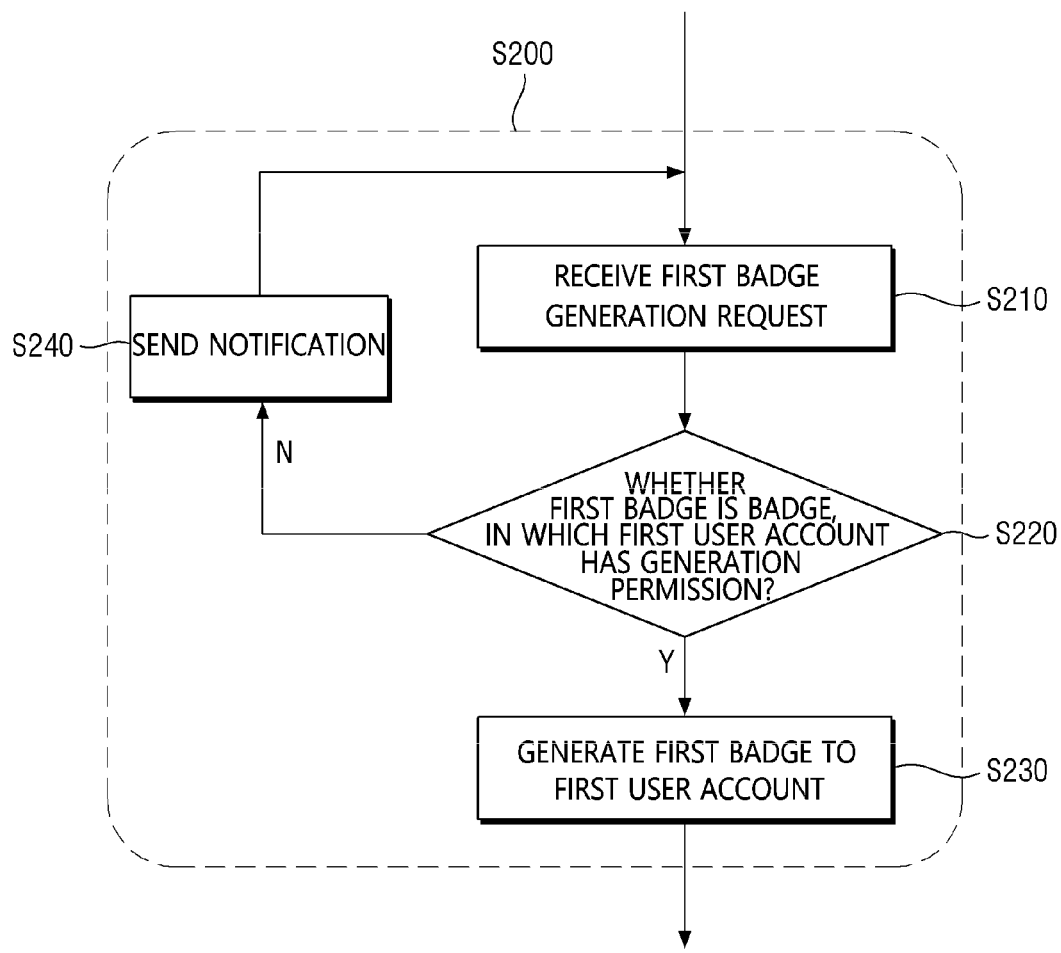
FIG. 4 is a flowchart for describing a first badge generation method of step S200 of FIG. 2.

Referring to FIG. 4, a first badge generation request is received from the first user account (S210), to which a badge generation permission is granted through the badge generation permission granting process (S100).

Next, the first badge is determined whether the first user account has a badge having the generation permission (S220). For example, it is determined whether the type of badge included in the badge generation permission granted to the first user account through S100 is the same as the type of badge included in the badge generation request received in step S210.

That is, it can be understood that even a user with a badge generation permission does not have permission to generate all types of badges, but only a badge within the range that can be generated.

If it is determined that the first user account has the generation permission, the first badge may be generated to the first user account (S230). Here, the generation of a badge may be understood as the generation of data, in which information, such as a holding permission represented by the badge, is packaged. Hereinafter, data generated together with the generation of the badge will be expressed as a 'badge container.'

When some embodiments of the present disclosure are implemented using the blockchain technology, the history associated with the badge may be included in the blockchain and distributed and stored. The history associated with the badge is related to generation of the badge, transfer of the badge, activation of the badge, deactivation of the badge, extinction of the badge, and the like, and may be understood as indicating transaction related to the badge.

Further, the addition/removal/change of the permission of the badge as well as the transaction related to the badge may be included in the blockchain and distributed and stored. That is, changes in the badge container can also be included in the blockchain. As such, when the transaction related to the badge or the permission information included in the badge is stored in the blockchain, the effect that the reliability of the badge can be improved is yielded.

On the contrary, when it is determined that the first user account does not have a generation permission, a notification that a generation permission is required for the first user account may be generated (S240). For example, the administrator of the entertainment agency may be granted only a badge generation permission that includes the permission for managing an affiliated artist. In this case, when the first user account of the administrator of the agency requests the generation of a badge containing the permission for patent management, a notification may occur. As such, by not granting the administrator account the permission to generate all the badges in a batch, the restriction may be imposed in the generable badges even in the administrator account to improve the expertise and reliability of each badge.

Referring back to FIG. 2, after the first badge is generated by the badge generation process (S200), the first badge is granted to the second user account. Here, the second user account may be an account of a user, who has a contractual relationship with the user of the first user account. For example, the first user account may be an administrator account of the agency, and the second user account may be an account of an artist belonging to the agency. Hereinafter, a description will be given with reference to FIG. 5.

Figure 5:
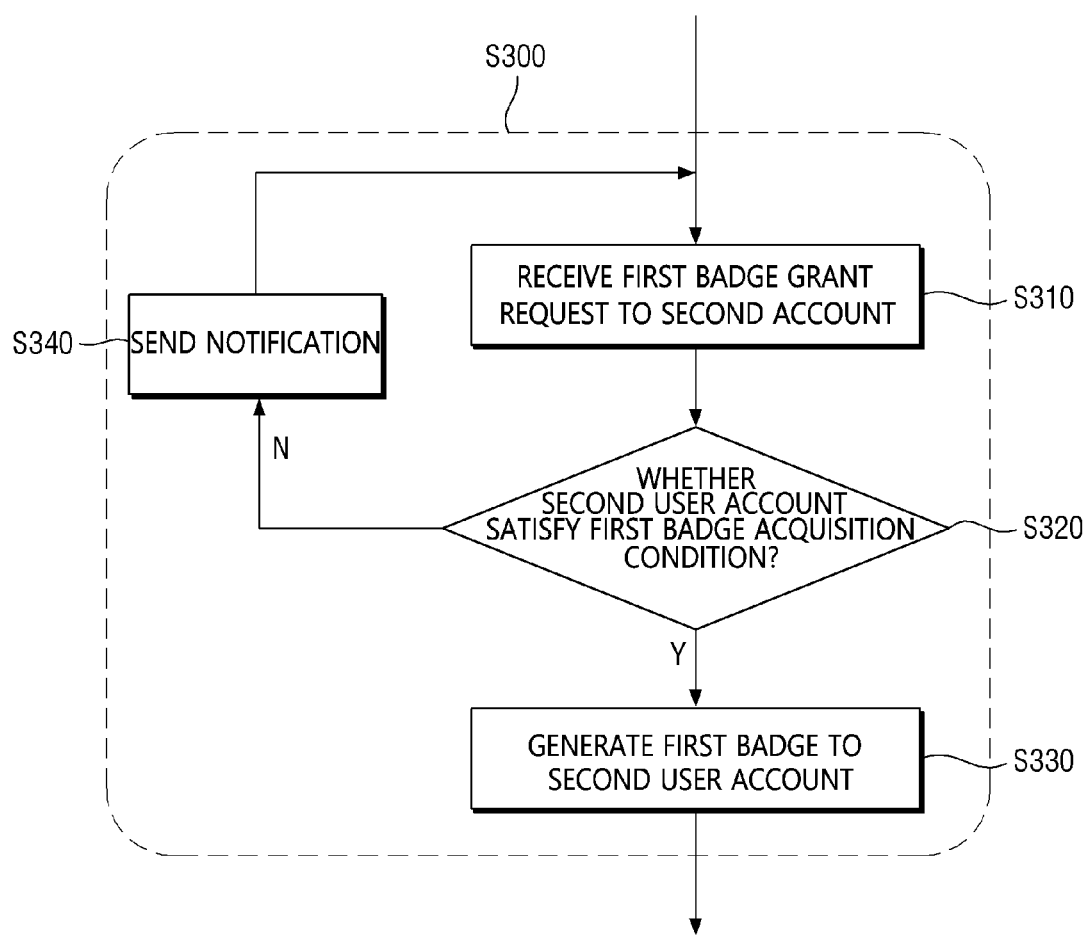
FIG. 5 is a flowchart for describing a method of granting a first badge in step S300 of FIG. 2 to a second user account.

Referring to FIG. 5, first, a first badge granting request is received from a user account (S310). The request may be sent from a first user account having the first badge generation permission or may be sent from a second user account.

Next, when receiving the first badge granting request from the second user account in step S310, it is determined whether the second user account satisfies the acquisition condition of the first badge (S320). Here, the acquisition condition means the qualification condition, which can acquire a badge. The acquisition condition may be included in a badge container the badge. That is, the condition, under which a badge can be granted, may be included in the badge container of the badge. In addition, when there is a badge movement request from the first user account to the second user account, it may be determined whether the second user account satisfies the acquisition condition included in the badge container of the moving target badge.

In some embodiments, the acquisition condition may indicate that the second user account is included in the badge acquirable account list specified in the acquisition condition. That is, the badge acquirable user of this case is limited to the user already specified at the time of generating the badge. For example, in the case of a badge granted only to members of a specific artist group, the acquisition condition may be set as in this embodiment. In this case, the acquisition condition may be adjusted only by the user who generated the badge. More specifically, as for a badge granted only to a member of a specific artist group, as the withdrawal and new recruitment of a member occurs, the acquisition condition can be adjusted post-mortem by the entertainment agency of the artist group (that is, the user who generated the badge).

In some embodiments, the acquisition condition may be set to determine acquisition availability based on an activity indicator in a platform of the second user account. For example, the acquisition condition may be set so that the authentication fan badge of the first artist is granted only if the total listening/viewing time of the content of the first artist exceeds the reference time, the number of visits to the page of the first artist exceeds the reference number, or the amount of linked product purchases embedded in the page of the first artist exceeds the reference amount.

In some embodiments, the acquisition condition may be set such that acquisition availability is determined according to context information related to a badge movement request from the first user account to the second user account. For example, the acquisition condition may be set so that the badge can be acquired when at least some of the time, location, and weather at the time when the badge movement request is received satisfy a specific condition. As an application example, the acquisition condition may be set so that badge movement is possible only when more than 100 persons gathered in a specific place request badge movement to the first user account at the same time.

Some embodiments related to the acquisition conditions of the badge have been described. As described above, the badge is a kind of information container that contains the permission on the platform service, and the badge itself may serve as a proof that the page, on which the badge is displayed, is not an impersonation page. Further, the badge contains the acquisition conditions for the acquisition of the badge. Therefore, from the perspective of the operator implementing the platform service, the technical effect of implementing various badge acquisition conditions without modifying the platform service operation logic is obtained.

In some embodiments, a badge generated with the technique according to the present disclosure may be used on an external platform other than the platform implemented with the method according to the present disclosure. In this case, determination logic for determining the acquisition condition of the badge may be included in the badge. The determination logic may be implemented in script codes of, for example, JavaScript and ASP. The determination logic for determining the acquisition condition of the badge is also included inside the badge, thereby obtaining an effect of further extending the application range of the technology according to the present disclosure.

Next, if it is determined in step S320 that the second user account satisfies the first badge acquisition condition, a first badge may be generated in the second user account (S330). On the contrary, when it is determined in S320 that the second user account does not satisfy the first badge acquisition condition, notification may be sent to the first user account (S340).

Referring back to FIG. 2, when the first badge is granted to the second user account through S300, the first badge may be equipped to the second user account to activate the first permission (S400). Here, the first permission may mean various permissions depending on the relationship between the first user account and the second user account.

In some embodiments, the first permission can be an upload permission for the content. The content may be various types of digital content such as an image, a video, a flash, a document, a web page, a link, and the like. At this time, the badge may contain a permission to upload only specific content among the various types of content upload methods. For example, there may be a badge containing a permission to upload music content or a badge containing a permission to upload video content.

Alternatively, it may be a permission to upload content of a size equal to or smaller than the specified size within a specific content upload format. For example, as for the music content upload permission, the badge may include a permission, in which a size or length that can be uploaded is specified, such as a one-minute upload permission or a full music upload permission.

In some embodiments, when uploading content in response to an upload request of a second user account having the first permission activated, it is determined whether the content is content produced by a user of the second user account, and if the content is not produced by the user, uploading may be restricted. That is, the permission that allows uploading of only directly produced content can be included in the badge. This permission can protect the right and profit of content producers from indiscriminate sharing.

In some embodiments, the first permission may be a permission to use commerce on the platform. For example, it may be a record release permission, a market system use permission, an administrator page use permission, and the like.

In some embodiments, the badge may contain contractual relationships and contents. The contract may include various contractual relationships such as a revenue contract, an exclusive contract and a partnership contract. For example, a partnership contractual relationship between a patent firm and a company may be included in the badge.

In this case, the first permission may be the permission of a user of a second user account belonging to the patent firm to access content uploaded to the first user account of the company having the partnership contractual relationship without the consent of the first user.

In some embodiments, a certificate may be included in the badge for the user's specific behavior within the platform. The user, who is granted the badge containing the certificate, may also receive special rewards, benefits or services. For example, there may be a badge that certifies the act of listening to a specific singer's music for more than 1000 hours. Further, the user, who has been granted the badge, will be able to receive benefits such as the pre-release of goods of the specific singer or pre-sale of fan meeting tickets.

In some embodiments, data may be categorized by badge to list up users who own a specific badge. Further, a badge can be searched through the search function. For example, a user account equipped with a first badge may be categorized into a first group, and a user account equipped with a second badge may be categorized into a second group, and the user accounts included in the first group can be displayed in response to a search request for the first badge. Through the data categorization by badge and search function, advertisement can be exposed to only a person with a specific badge, and thus there is an effect of making targeting advertisements.

The badge may be freely generated, managed and withdrawn by a user who has the permission of the operator of the platform or the badge master and can be granted to the users of the platform.

In some embodiments, when the first permission is activated, a platform activity history score associated with the first permission may be used. Hereinafter, a method of using the platform activity history score will be described with reference to FIG. 6.

Figure 6:
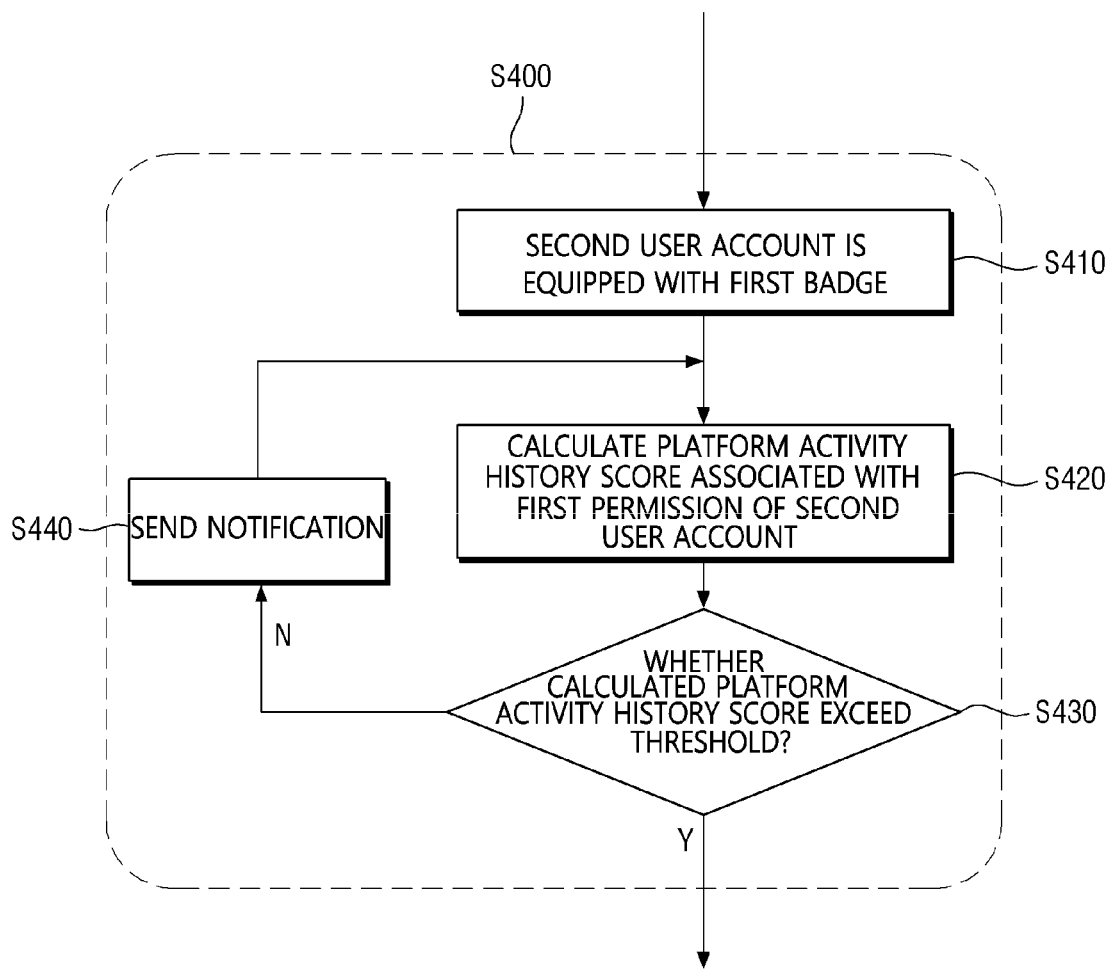
FIG. 6 is a flowchart for illustrating a method of activating a first permission of a second user account equipped with a first badge to a second user account in step S400 of FIG. 2.

Referring to FIG. 6, a first badge granted to a second user account is equipped to the second user account in step S300 (S410).

Next, the platform activity history score associated with the first permission of the second user account is calculated (S420).

Next, it is determined whether the platform activity history score calculated in step S420 exceeds a threshold (S430). If it is determined in step S430 that the threshold is not exceeded, the notification is sent to the first user account (S440).

In some embodiments, extinction may be requested for the badge granted to the second user account from the first user account that received the notification. In response to the extinction request, the first permission of the second user account may be deactivated, and the first badge of the second user account may be extinguished. However, it is not limited thereto.

That is, if a second user account equipped with a first badge does not maintain platform activity associated with the first permission, a notification is sent to the first user account and the permission of the second user associated with the first permission may be extinguished according to the request of the first user account, thereby improving the management performance of the first user account for the second user account.

Referring back to FIG. 2, when the first permission is activated as the first badge is equipped to the second user account in step S400, a first contractual relationship between the first user account and the second user account and the content of the first permission may be stored in the blockchain. That is, the badge can contain a variety of functions, all of which can be recorded in the blockchain of the contracting parties and the providers of the platform services.

In some embodiments, for a first badge, a transfer requesting the transfer of a first badge from a second user account to a fourth user account request may be received, and the received transfer request may be sent to the first user account. In this case, the transfer of the first badge may be activated from the second user account to the fourth user account only when there is the consent of the first user account in response to the transfer request. At this time, for the transferred badge, it is possible to overcome the security issues that may occur due to the transfer of the badge by using script codes, such as JavaScript and ASP.

That is, by setting the badge so that the badge can become a thing in kind and be transacted between users, such as transfers, purchases and sales, the value of the badge can be increased and the user can easily obtain the badge according to the necessary permission.

Hereinafter, a description will be given with reference to an exemplary diagram showing a screen of a supporting device providing a badge system that can be referred to in various embodiments of the present disclosure.

Referring to FIGS. 7 to 12, management tasks, such as badge generation and management, content management, and the like, will be described through an administrator page. Hereinafter, an administrator page of an agency of an artist group will be described as an example, but this is only an example and is not limited thereto.

Figure 7:
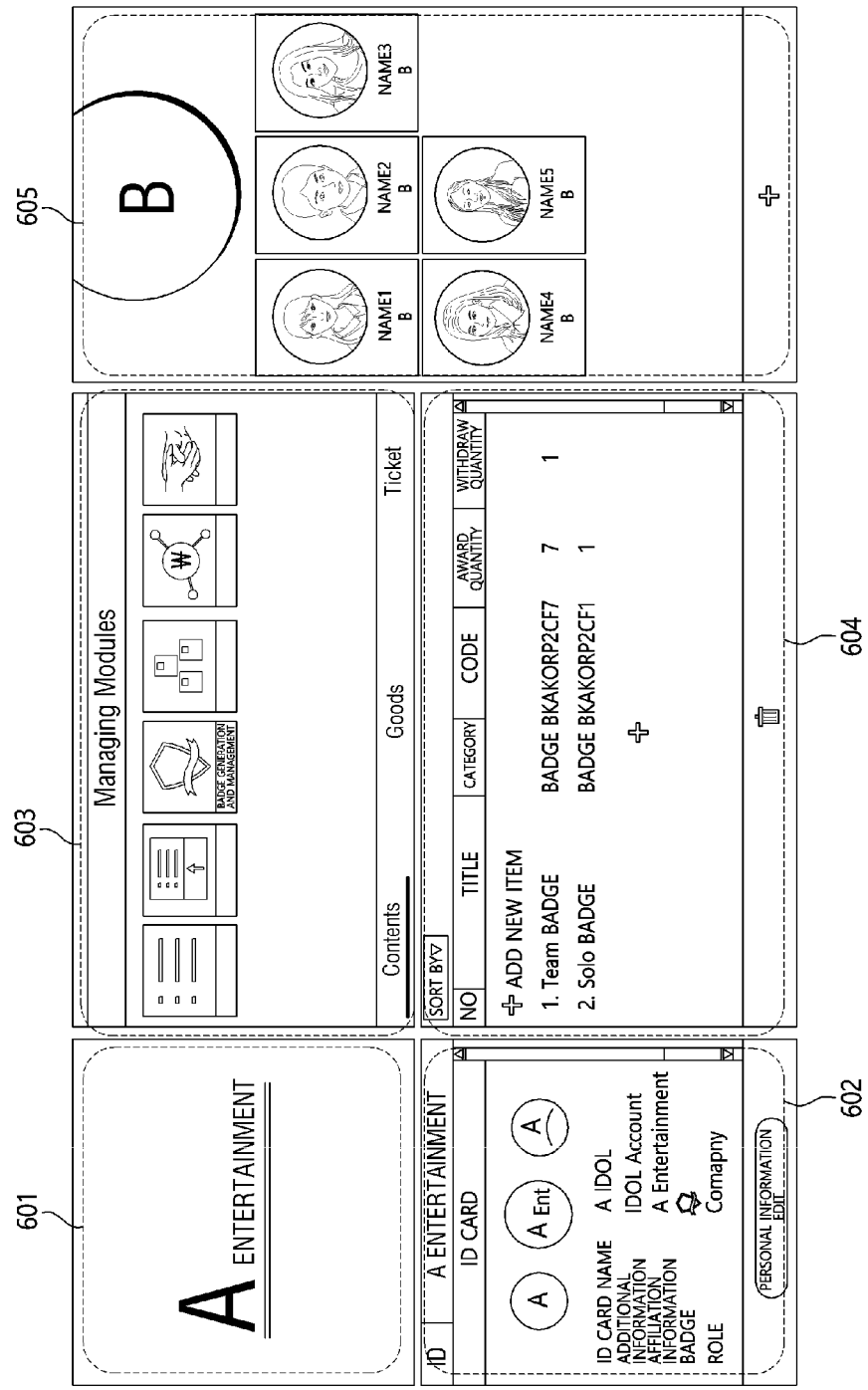

Each agency may receive a web administrator page as shown in FIG. 7 through the decision of the platform operator. Through this page, management tasks, such as badge generation and management, content management, warehouse registration and management may be performed.

As shown in FIG. 7, the web administrator page is divided into five main areas 601, 602, 603, 604 and 605. In detail, the logo of the agency is displayed in the first area 601. In the second area 602, an ID card name, additional information, affiliation information, a badge, a role, and the like are displayed, and an icon for editing personal information is displayed.

The third area 603 displays a menu for managing, such as viewing content, uploading content, generating and managing a badge, registering and managing a warehouse, status of a profit share and managing a partner. In the fourth area 604, titles, categories, codes, remaining quantities, and display states of contents managed by the agency are displayed. Further, the fifth area 605 displays a list of artists connected to a specific badge. Upon touching the badge generation and management tab of the third area 603, the screen shown in FIG. 8 may be displayed. Further, when any one badge of the badge lists displayed in the fourth area 603 is selected, a list of artists connected to the badge selected in the fifth area 605 may be displayed.

Figure 8:
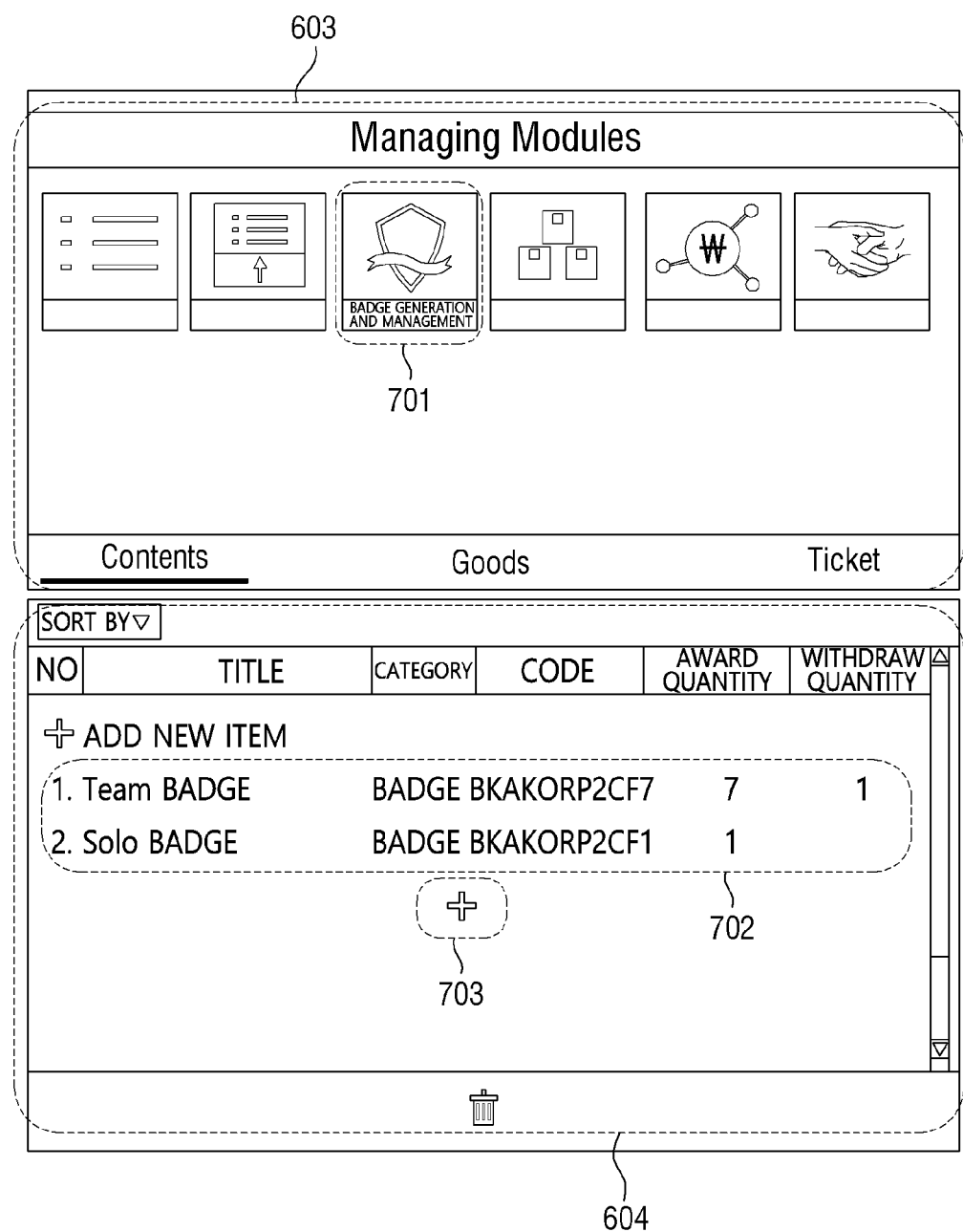
Figure 9:
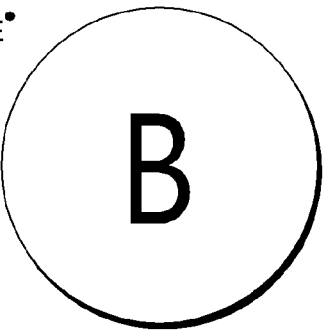

As shown in FIG. 8, when the badge generation and management tab 701 of the third area 603 is touched, the badge list 702 and the + button 703 that are currently present in the fourth area 604 are displayed. When an input is made to the + button 703, a screen for generating a badge is displayed as shown in FIG. 9. The screen for generating a badge is divided into an area 801 representing an agency account and an area 802, in which basic information of a badge can be set. The area 802, in which basic information of a badge can be set, will be described in detail with reference to FIGS. 10 to 11.

Figure 10:
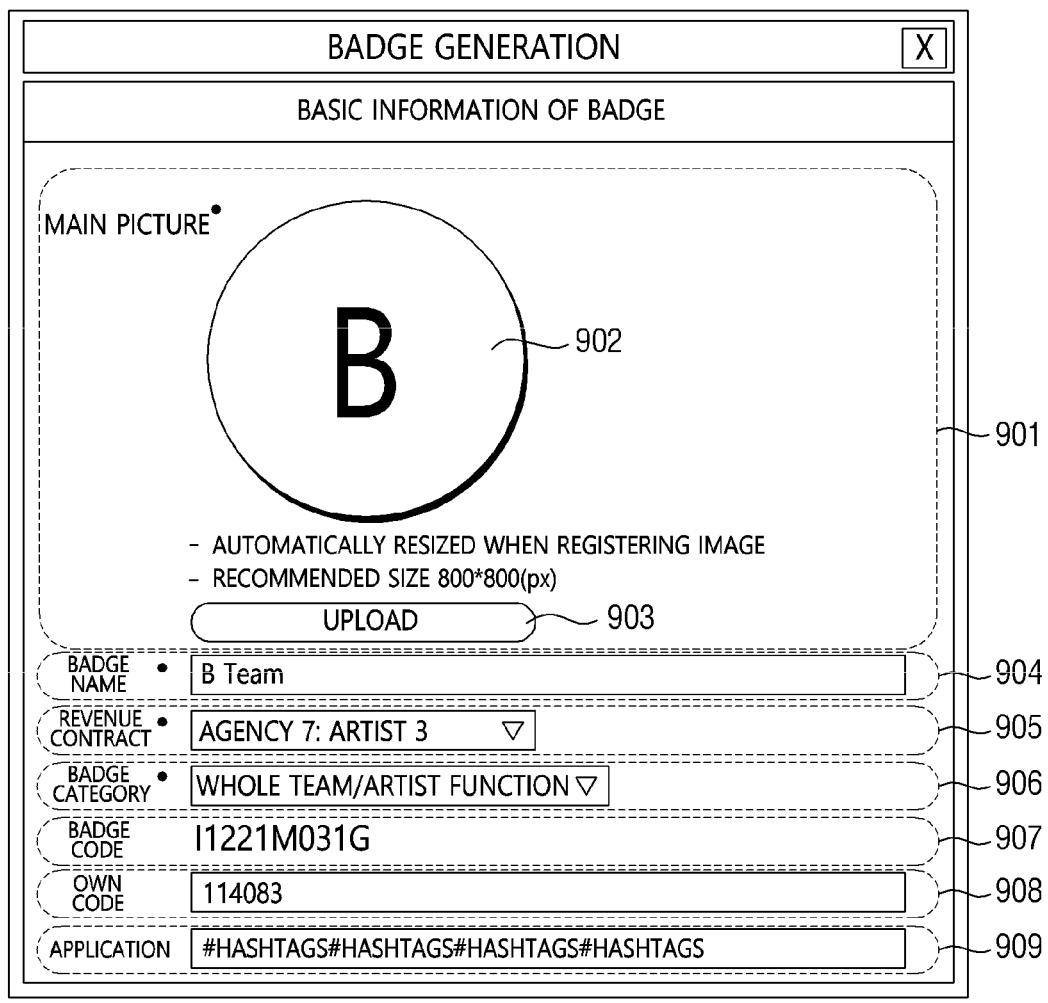

Referring to FIG. 10, a screen for setting basic information of a badge for generating a new badge is shown. The area representing the basic information of the badge may be divided into nine main areas. However, the present invention is not limited thereto and may be variously set according to the number of basic information of the badge to be set.

The first area 901 is an area for setting a main picture. When an input to the upload icon 903 is received, a function for uploading a desired image is activated. When a desired image is uploaded through the activated function, it may be uploaded as a badge image 902 in the first area. However, it is not limited thereto.

A badge name is set through the second area 904. Here, the badge name may be made of a text, and may be determined through a mutual agreement between the administrator and the artist or may be determined and notified by the administrator. However, it is not limited thereto.

A revenue contract is set through the third area 905. In this case, the revenue contract refers to the sharing of revenue between the agency as the administrator and the artist equipped with the badge. For example, the ratio may be set to 7 for the agency and 3 for the artist.

The badge category is set through the fourth area 906. Here, the badge category means to categorize each type of badge. For example, the category may be selected as the whole team artist function as shown in FIG. 7. The permission, which is activated when the badge is equipped for each category, may be set. However, it is not limited thereto.

A badge code is granted through the fifth area 907. Here, the badge code may, be a code used to distinguish a badge on the platform or used for being recorded in a blockchain. The badge code may be granted with a unique number for each badge. However, it is not limited thereto.

The own code is set through the sixth area 908. Here, the own code refers to code assigned by the agency, that is, the administrator. Unlike a badge code, a unique number does not need to be assigned to each badge, and each administrator account may describe for the convenience of managing a badge held by a user of the administrator account.

An application, to which the badge can be applied, may be set through the seventh area 909. As illustrated in FIG. 9, a plurality of applications may be set.

FIG. 11 shows a screen for setting detailed contracts and additional information. Here, the detailed contract and additional information refer to basic settings, separate special contracts and products that can be sold through the market, and the like.

The first special contract may be specified through the first area 1001. For example, the first special contract may be about content that does not pass through a distributor or an agency. The revenue sharing between the agency and the artist for the first special contract may be specified through the second area 1002. FIG. 11 shows the ratio of agency 5:artist 5 as an example of sharing for the first special contract.

The second special contract may be specified through the third area 1003. For example, the second special contract may be for blockchain points that fans have given directly. Through the fourth area 1004, the revenue sharing between the agency and the artist for the second special contract may be specified. For example, blockchain points given directly by fans may be specified to be revenue shared at a ratio of agency 2:artist 8.

Whether to configure the market may be set through the fourth area 1005. For example, the market configuration may be partially allowed. Authorized products that can be sold through the market may be specified through the fifth area 1006. For example, only ready-made products may be set as an authorized product among authorized products such as records, clothing, handmade products, and ready-made products. However, it is not limited thereto.

Figure 12:
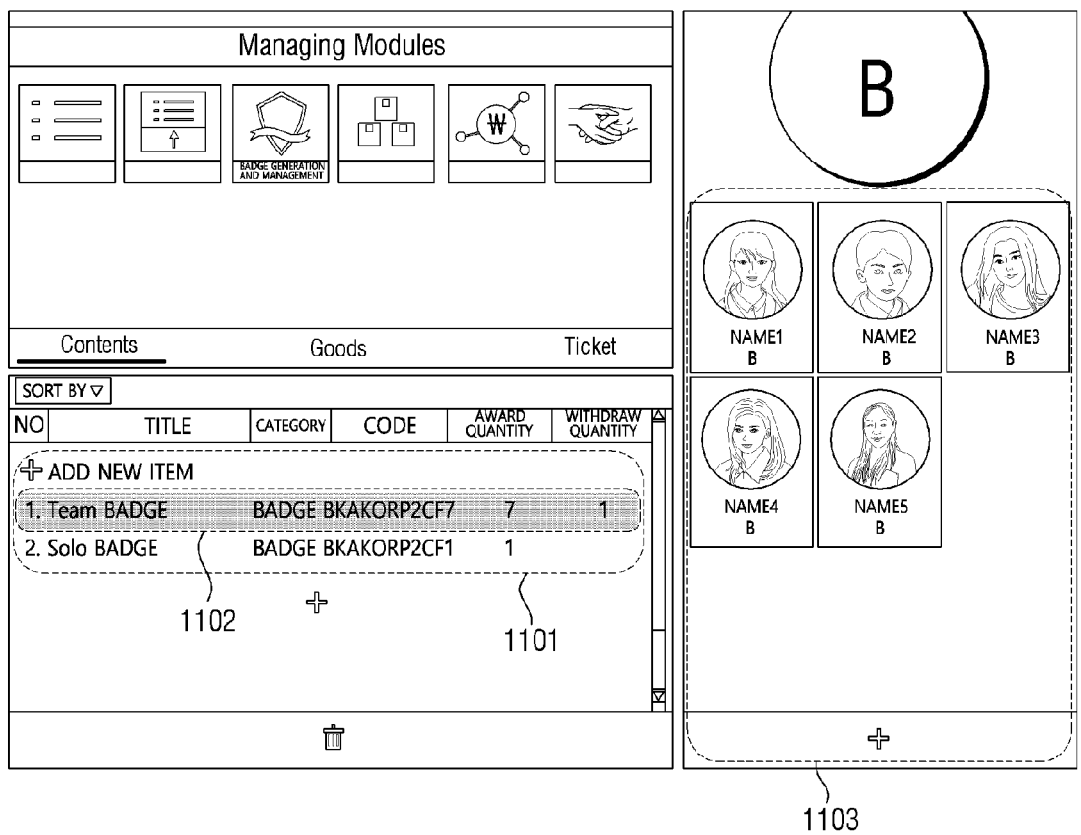

FIG. 12 illustrates a screen, on which a badge list 1101 held by an administrator, is displayed. When one badge 1102 is selected from the badge list 1101, an artist connected to the corresponding badge may be displayed in the right region 1103.

If the generated badge is touched once more, the contents set through the user interface shown in FIGS. 9 to 11 can be checked. Since this is recorded in the blockchain, it may be modified with mutual consent.

The badge system allows the agency to connect to all the affiliated artists. This is not just a connection, but a functional connection through the blockchain, which can apply contractual relationships to online activities. Further, accounts with badges awarded by the agency may use the platform under the influence of the corresponding badge attributes and functions even if they act with a ID card without the badge.

Through the function of connecting the agency to the artist with the badge, the effect that can add the function, in which the agency can check before the artist uploads content, is yielded. It can be freely selected for a period of predetermined time and can be changed under mutual consent.

When each artist's profile displayed in the right region 1103 of FIG. 12 is clicked, a personal page of each artist can be checked and added. Hereinafter, the personal page will be described with reference to FIGS. 13 to 21.

Figure 13:
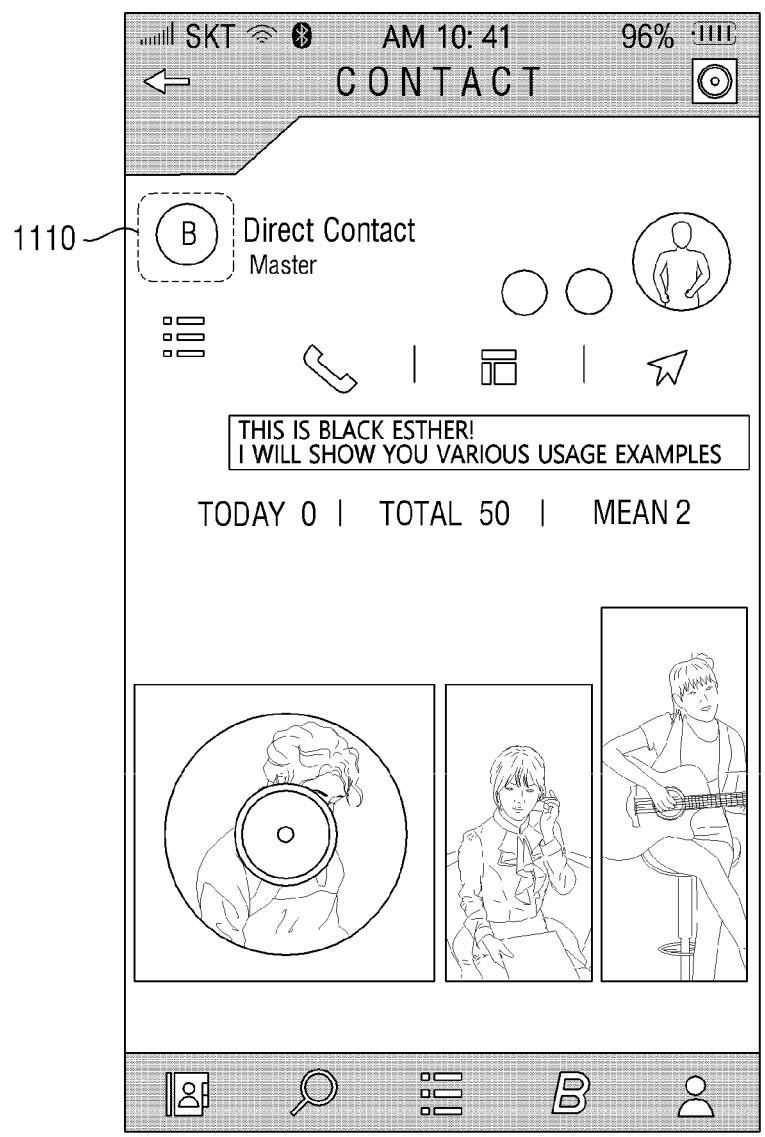
FIG. 13 is an exemplary diagram of a personal page provided through the platform.

FIG. 13 is an illustration of a personal page. Each user's ID card is given a personal space to decorate, and three personal spaces can be decorated per person. However, it is not limited thereto.

Different badges may be equipped to the upper left 1110 for each ID card. When the equipped badge is clicked, the detailed description of the badge (shape, name, function of the badge) is displayed. In this case, the detailed description may be specified by the user of the first user account. In this case, the modifying function of the detailed description may be activated only when there is mutual agreement between the first user account and the second user account. However, the present invention is not limited thereto and the modifying function of the detailed description can be activated in various ways. For example, the first user account may activate the modifying function of the detailed description alone without mutual agreement of the first user account and the second user account.

Figure 14:
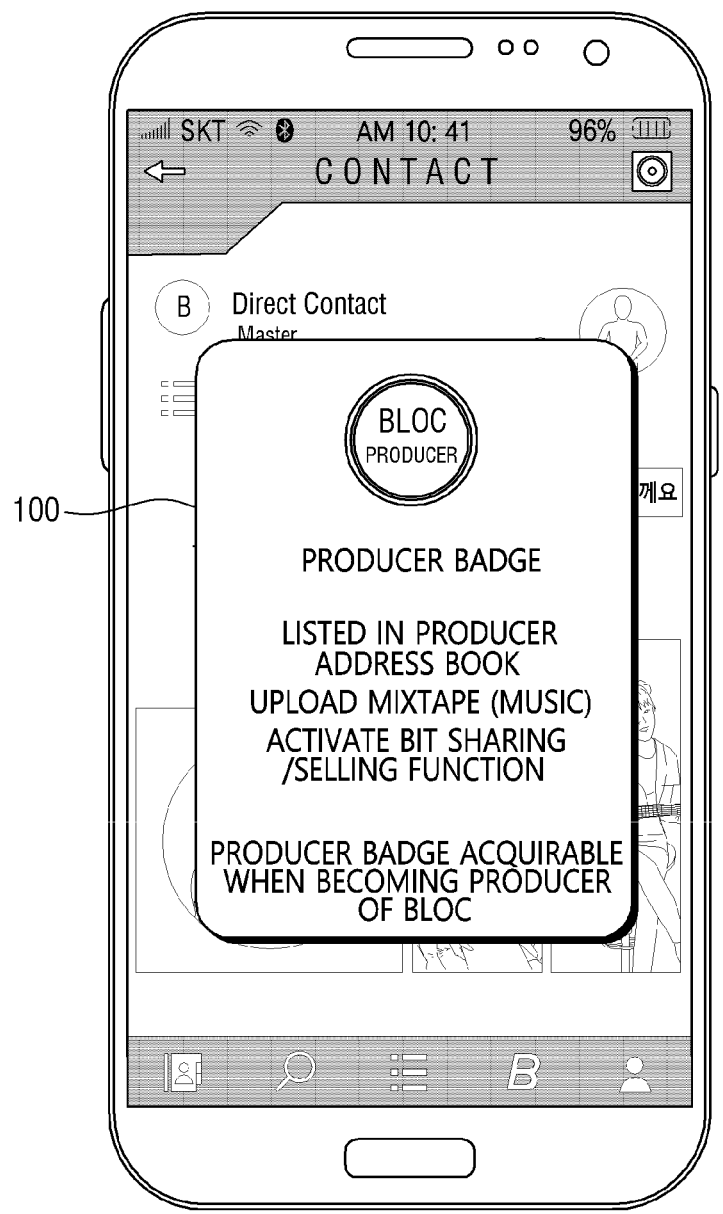
FIGS. 14 to 18 are exemplary diagrams of a badge.

Referring to FIG. 14, the shape and name of the producer badge are shown, and the description that the permissions to be listed in the producer address book and upload a mix tape and the permission to share and sell a bit are activated are displayed. Further, the badge acquisition condition, in which a badge can be acquired when becoming a producer of the bloc, is displayed.

FIGS. 15 to 18 show various types of badges. This is merely illustrative, and it is obvious that more various badges may be included.

Figure 15:
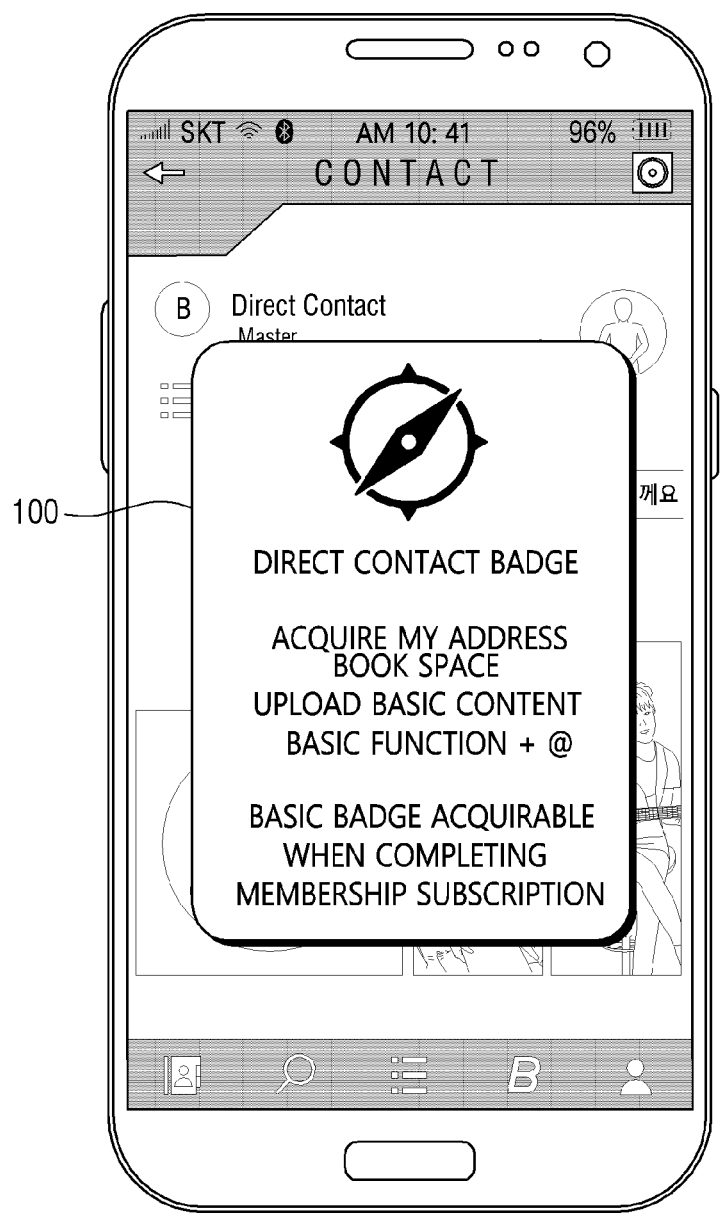

Referring to FIG. 15, a user account equipped with a direct contact badge acquires a page space and includes a basic content upload permission. Further, the badge acquisition condition, in which a basic badge can be obtained by completing membership subscription, is displayed.

Figure 16:
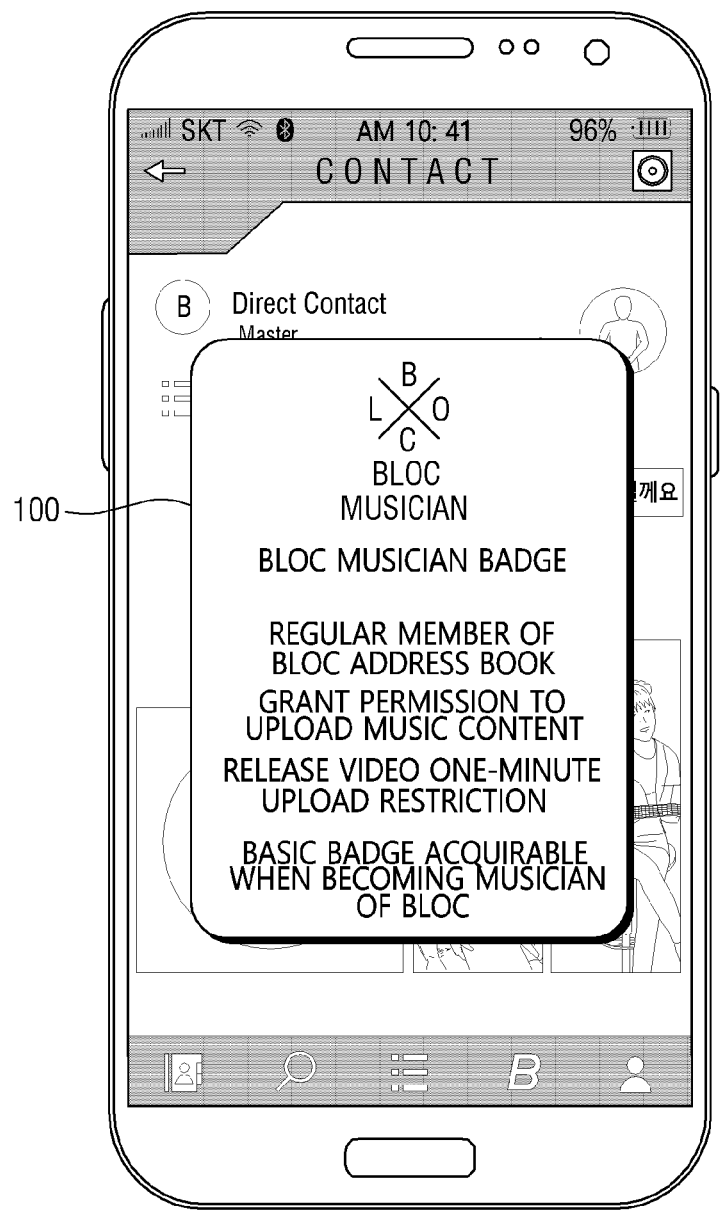

Referring to FIG. 16, a user account equipped with a bloc musician badge represents a regular member of a bloc and is granted the permission to upload music contents. Further, the one-minute upload restriction of the video content may be released. The bloc musician badge acquisition condition is to become a musician of the bloc.

Figure 17:
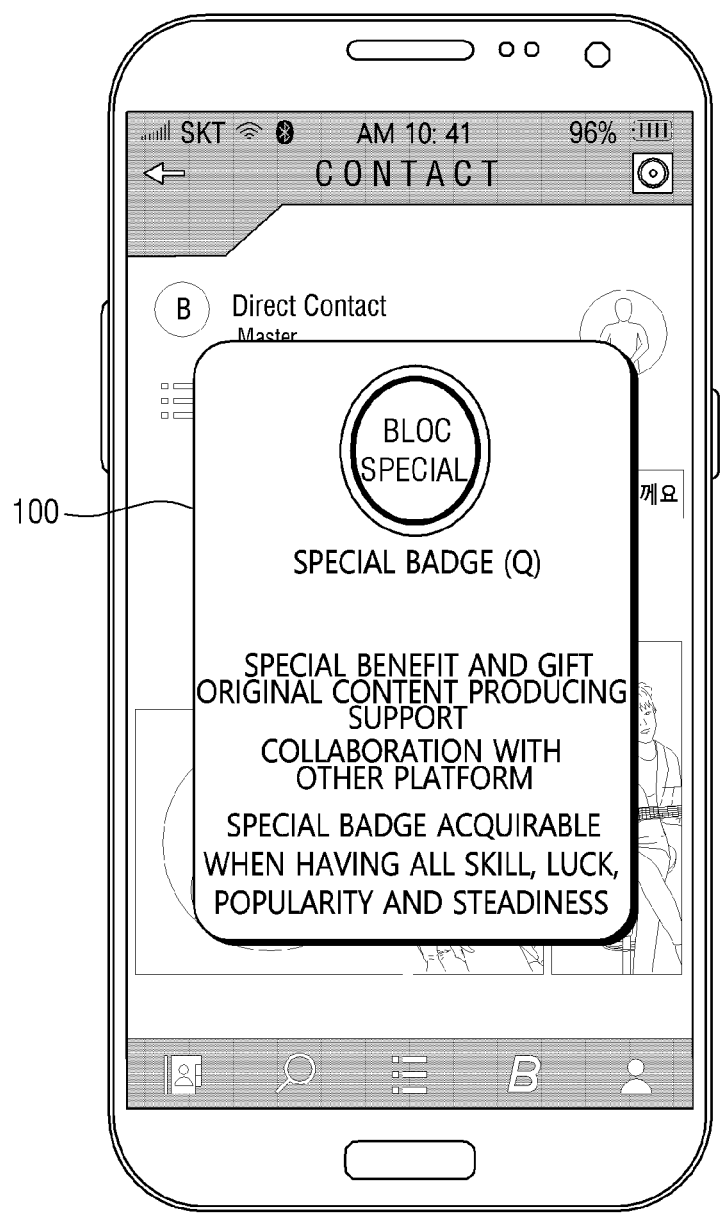

Referring to FIG. 17, a user account equipped with a special badge is granted permissions such as special benefits, gifts, original content producing support and collaboration with other platforms. The acquisition condition of the special badge is having all of skills, luck, popularity, and steadiness.

Figure 18:
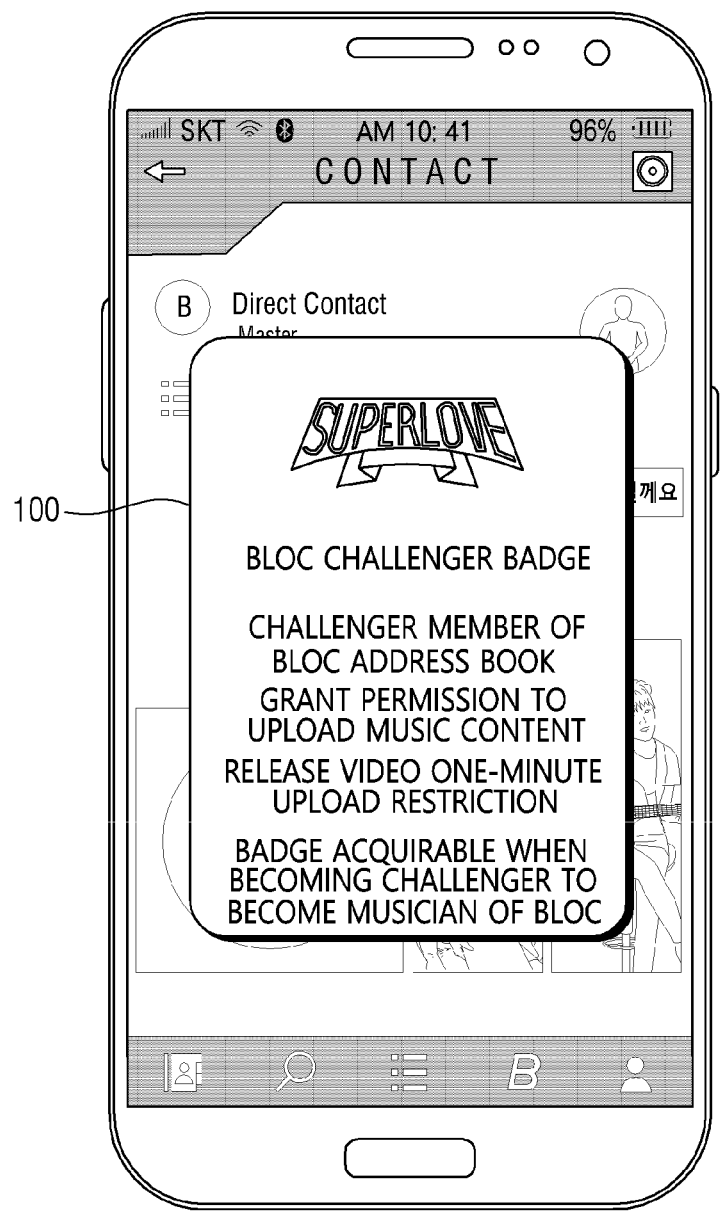

Referring to FIG. 18, a user account equipped with a bloc challenger badge is authenticated as being a challenge member of the bloc address hook. The bloc challenger badge may be granted the permission to upload music contents, and the video one-minute upload restriction may be released. To become a challenger to become a bloc musician is the acquisition condition of the bloc challenger badge.

A badge equipping and replacement method in the personal page will be described with reference to FIGS. 19 to 22.

Figure 19:
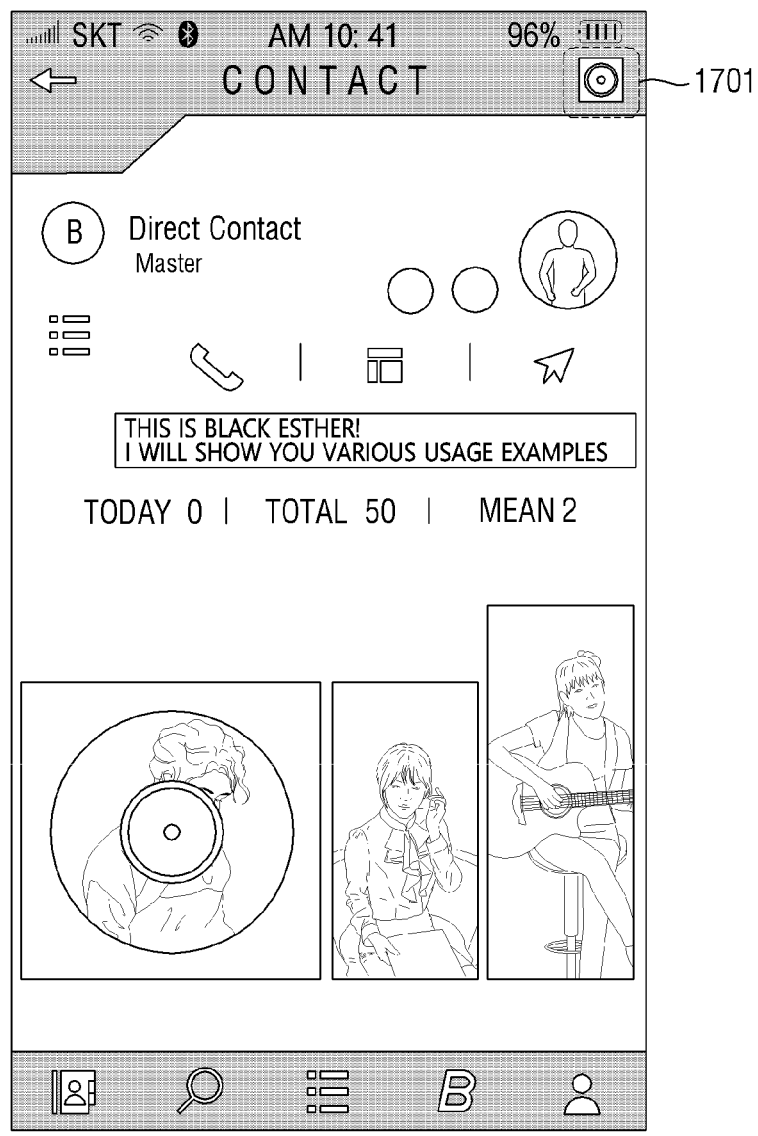
FIGS. 19 to 22 are exemplary diagrams of a personal page displayed on a user terminal for describing a method of equipping and replacing a badge on a personal page.
Figure 20:
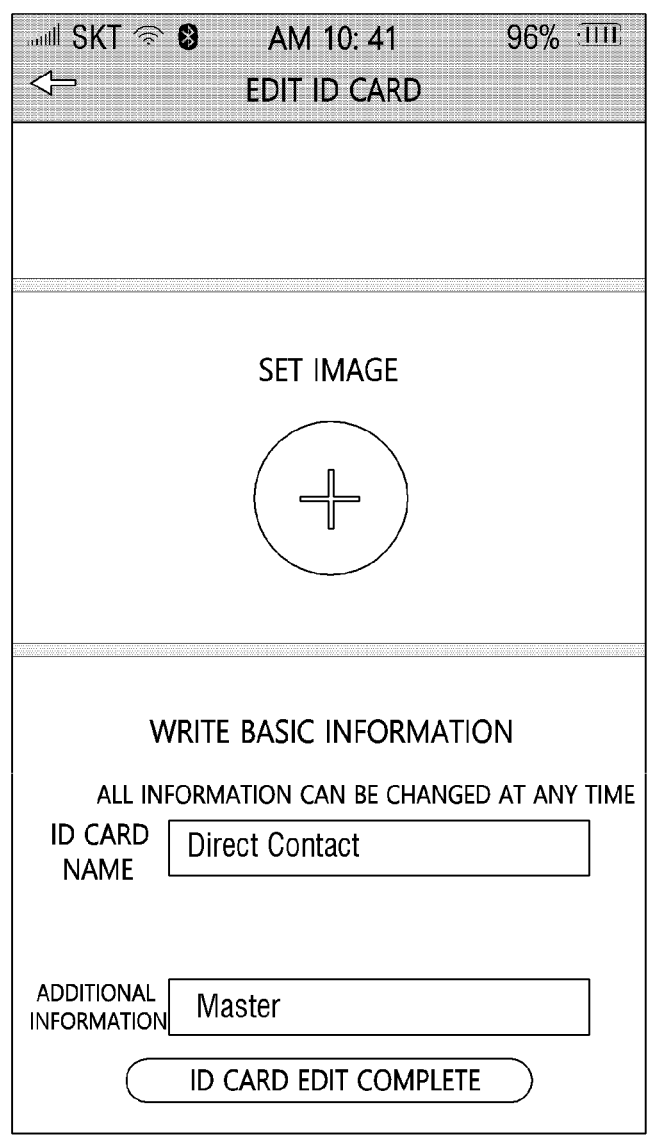

Referring to FIG. 19, when the setting icon 1701 at the top right of the personal page is clicked, an editing mode for setting a badge may be executed. Basic information such as an ID card name and additional information may be written and an image may be set through the editing mode illustrated in FIG. 20.

Figure 21:
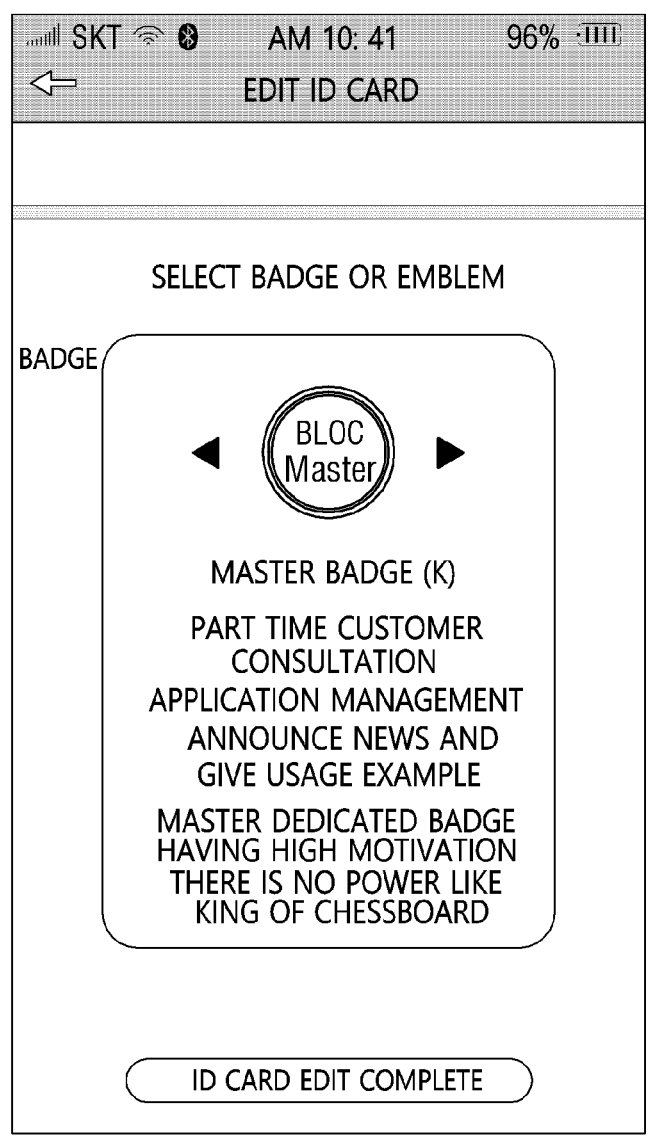

A badge or emblem selection function among ID card editing functions will be described with reference to FIGS. 21 through 22. Referring to FIG. 21, it can be seen whether the badge is applicable to the corresponding ID card by checking the name, the image, the description, the function, etc. of the owned badges. One of them is selected and the edit complete button can be clicked.

Upon clicking the edit complete button, it returns to the personal space screen and the selected badge is applied in the upper left to the edit mode. This is shown in FIG. 22.

Figure 22:
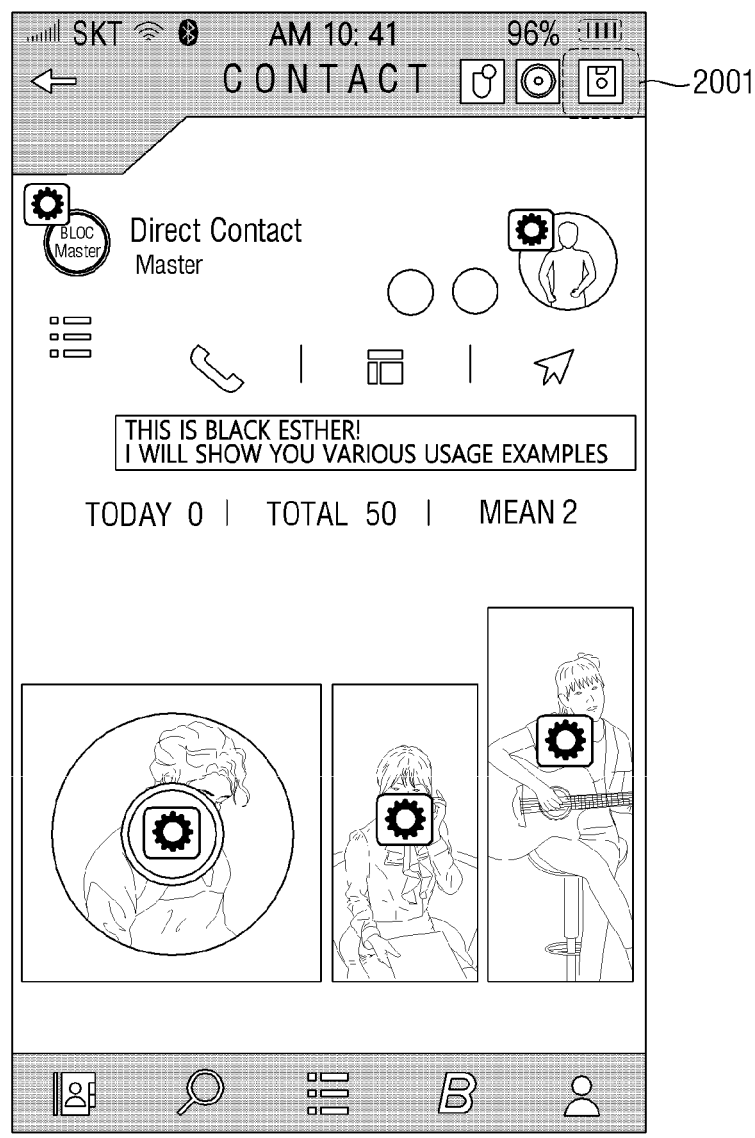

In FIG. 22, when the save button 2001 in the upper right is pressed, personal space editing is completed, and the selected badge is registered. Further, the function contained in the badge can be applied and executed.

Hereinafter, an exemplary computing device 100 that can implement an apparatus and a system, according to various embodiments of the present disclosure will be described.

Figure 23:
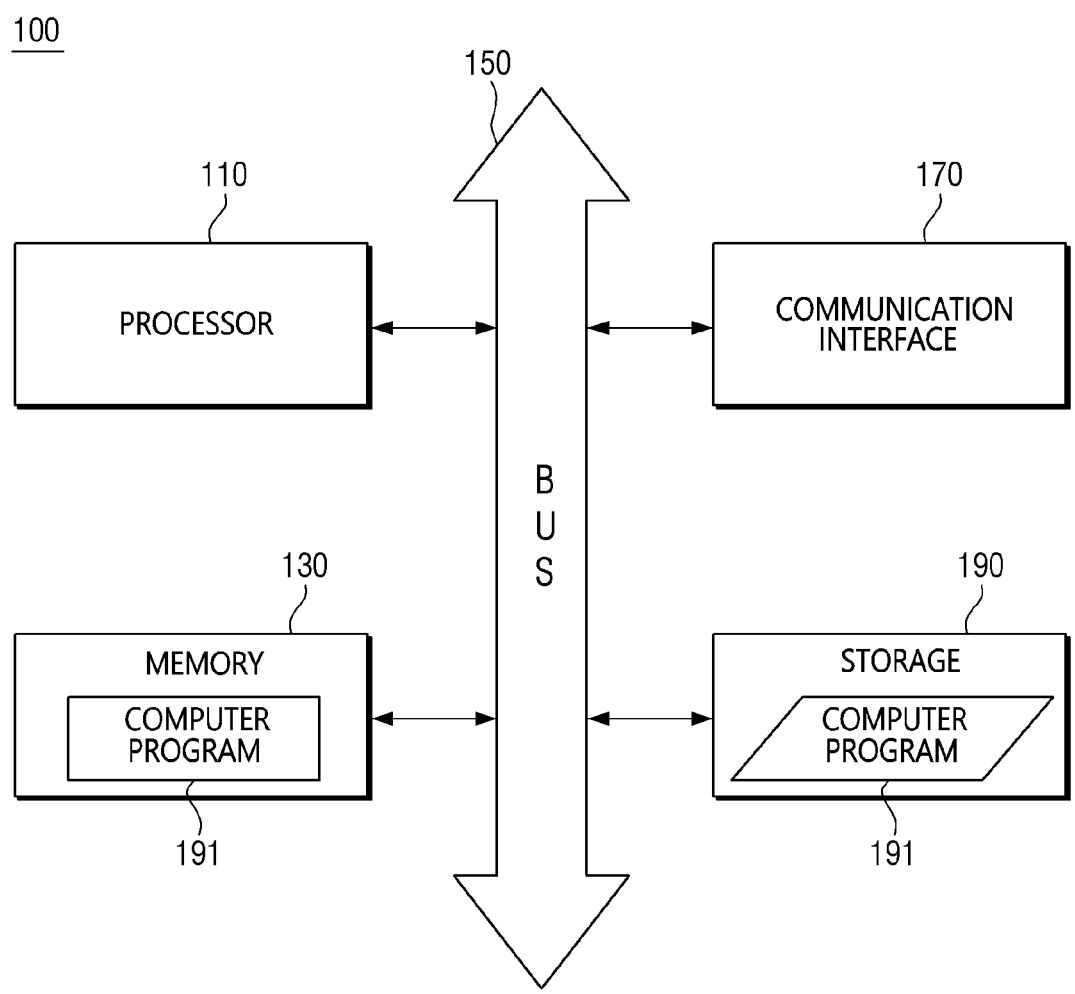
FIG. 23 is a hardware configuration diagram illustrating an exemplary computing device that can implement an apparatus according to various embodiments of the present disclosure.

FIG. 23 is an example hardware diagram illustrating a computing device 100.

As shown in FIG. 23, the computing device 100 may include one or more processors 110, a bus 150, a communication interface 170, a memory 130, which loads a computer program 191 executed by the processors 110, and a storage 190 for storing the computer program 191. However, FIG. 23 illustrates only the components related to the embodiment of the present disclosure. Therefore, it will be appreciated by those skilled in the art that the present disclosure may further include other general purpose components in addition to the components shown in FIG. 23.

The processor 110 controls overall operations of each component of the computing device 100. The processor 110 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 110 may perform calculations on at least one application or program for executing a method/operation according to various embodiments of the present disclosure. The computing device 100 may have one or more processors.

The memory 130 stores various data, instructions and/or information. The memory 130 may load one or more programs 191 from the storage 190 to execute methods/operations according to various embodiments of the present disclosure. An example of the memory 130 may be a volatile memory such as a RAM, but is not limited thereto.

The bus 150 provides communication between components of the computing device 100. The bus 150 may be implemented as various types of bus such as an address bus, a data bus and a control bus.

The communication interface 170 supports wired and wireless internet communication of the computing device 100. The communication interface 170 may support various communication methods other than internet communication. To this end, the communication interface 170 may be configured to comprise a communication module well known in the art of the present disclosure.

The storage 190 can non-temporarily store one or more computer programs 191. The storage 190 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 191 may include one or more instructions, on which the methods/operations according to various embodiments of the present disclosure are implemented. When the computer program 191 is loaded on the memory 130, the processor 110 may perform the methods/operations in accordance with various embodiments of the present disclosure by executing the one or more instructions.

The technical features of the present disclosure described with reference to FIGS. 1 through 23 so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A platform user management method using a badge system performed by a computing device comprising:
    granting a badge generation permission to a first user account, the first user account being an account of entertainment agency;
    generating a first badge according to a request for using the badge generation permission of the first user account;
    granting the first badge to a second user account when the second user satisfies an acquisition condition of the first badge, the second user account being an account of artist affiliated in the entertainment agency; and
    activating a first permission to the second user account when the first badge is equipped to the second user account,
    wherein the acquisition condition of the first badge is satisfied when the second user account is included in a badge acquirable account list, the badge acquirable account list being updated by the first user account, and
    wherein the first permission is a permission to upload contents in a platform.

2. The platform user management method of claim 1, wherein the first user account is an administrator account of a user of the second user account.

3. The platform user management method of claim 1, wherein the first permission is a permission to upload content,
    the method further comprises,
    uploading content in response to an upload request of a second user account having the first permission activated.

4. The platform user management method of claim 2, wherein uploading content in response to an upload request of a second user account having the first permission activated further comprises,
    determining whether the content is content produced by a user of the second user account and limiting uploading if the content is not produced by the user.

5. The platform user management method of claim 1, wherein the first permission is a permission to upload content of a specified type,
    the method further comprises,
    determining, in response to a content upload request of the second user account having the first permission activated, whether the requested content is content of the specified type and limiting uploading if the content is not content of the specified type.

6. The platform user management method of claim 1, wherein the first permission is a permission to upload content equal to or smaller than a specified size,
    the method further comprises,
    determining, in response to a content upload request of the second user account having the first permission activated, whether the requested content is content equal to or smaller than the specified size and limiting uploading if the content is not content equal to or smaller than the specified size.

7. The platform user management method of claim 1,
    wherein the first badge represents a first contractual relationship between the first user and the second user,
    wherein contract content of the first contractual relationship includes contract content for revenue sharing between a user of the first account and a user of the second account.

8. The platform user management method of claim 7 further comprises,
    providing a reward to a user of the first account and a user of the second account,
    wherein the reward is calculated according to the contract content for revenue sharing.

9. The platform user management method of claim 1 further comprises,
    generating a second badge according to a request of the first user account; and
    calculating an activity history score of a third user account for the platform and granting the second badge to a third user account if the activity history score exceeds a threshold.

10. The platform user management method of claim 9, wherein the platform activity history score is calculated according to time that the third user consumed uploaded content of the second user on the platform.

11. The platform user management method of claim 9 further comprises,
    providing a reward to a user of the third user account equipped with the second badge.

12. The platform user management method of claim 1, wherein the first permission is a permission to access content uploaded to an account of the first user without consent of the first user.

13. The platform user management method of claim 1, wherein activating a first permission of a second user account comprises,
    calculating a platform activity history score associated with the first permission and sending a notification to the first user account if the calculated activity history score is equal to or less than a threshold.

14. The platform user management method of claim 1 further comprises,
    including an user account equipped with the first badge in a first group, classifying a user account so that a user account equipped with the second badge is included in a second group, and displaying a user account included in the first group in response to a search request for the first badge; and
    deactivating the first permission of the second user account and extinguishing the first badge in response to the first badge extinction request of the first user account.

15. The platform user management method of claim 1 further comprises,
    receiving a transfer request for the first badge from the second user account to the fourth user account and sending the transfer request to a first user account; and
    activating transfer of the first badge from the second user account to the fourth user account only if there is consent of the first user account in response to the transfer request.

16. The platform user management method of claim 1 further comprises, displaying the first badge in a first area of the second user account in response to the first badge equipping request of the second user account, wherein displaying the first badge in a first area of the second user account comprises displaying a first detailed description of the first badge in response to an input to the first area.

17. The platform user management method of claim 16, wherein the first detailed description is specified by a user of the first user account, wherein modification of the first detailed description is activated by mutual agreement between the first user account and the second user account or activated only in the first user account alone without the mutual agreement.

18. The platform user management method of claim 1 further comprises, storing the first contractual relationship between the first user account and the second user account and content of the first permission in a blockchain.

19. A program stored in a computer readable recording medium, wherein the program executes in conjunction with a computing device steps comprising, granting a badge generation permission to a first user account, the first user account being an account of entertainment agency;

generating a first badge according to a request for using the badge generation permission of the first user account;

granting the first badge to a second user account when the second user satisfies an acquisition condition of the first badge, the second user account being an account of artist affiliated in the entertainment agency; and activating a first permission to the second user account when the first badge is equipped to the second user account, wherein the acquisition condition of the first badge is satisfied when the second user account is included in a badge acquirable account list, the badge acquirable account list being updated by the first user account, and wherein the first permission is a permission to upload contents in a platform.

20. A platform user management apparatus using a badge system comprising:

a memory for storing one or more instructions; and a processor, by executing the stored one or more instructions, for granting a badge generation permission to a first user account, the first user account being an account of entertainment agency, generating a first badge according to a request for using the badge generation permission of the first user account, granting the first badge to a second user account when the second user satisfies an acquisition condition of the first badge, the second user account being an account of artist affiliated in the entertainment agency and activating a first permission to the second user account when the first badge is equipped to the second user account, wherein the acquisition condition of the first badge is satisfied when the second user account is included in a badge acquirable account list, the badge acquirable account list being updated by the first user account, and wherein the first permission is a permission to upload contents in a platform.

\* \* \* \* \*